US006235868B1

(12) United States Patent
Guthrie et al.

(10) Patent No.: US 6,235,868 B1
(45) Date of Patent: May 22, 2001

(54) PORPHYRINOGENIC RESIN SYSTEMS AND POLYMERS DERIVED THEREFROM

(75) Inventors: James Thomas Guthrie, Kippax Leeds (GB); Richard Allan Morris, Grose Wold (AU); He Wei Dong, Leeds (GB)

(73) Assignee: The Australian National University, Australian Capital Territory (AU)

( * ) Notice: Subject to any disclaimer, the term of this patent is extended or adjusted under 35 U.S.C. 154(b) by 0 days.

(21) Appl. No.: 08/256,234

(22) PCT Filed: Dec. 24, 1992

(86) PCT No.: PCT/AU92/00682

§ 371 Date: Sep. 22, 1994

§ 102(e) Date: Sep. 22, 1994

(30) Foreign Application Priority Data

Dec. 30, 1991 (AU) ................................................ PL0198/91

(51) Int. Cl.[7] .............................. C08G 8/02; C08G 14/00; C08G 12/00; C08G 73/00
(52) U.S. Cl. .......................... 528/220; 528/125; 528/126; 528/128; 528/172; 528/173; 528/179; 528/180; 528/187; 528/228; 528/327; 525/471; 525/480; 524/606; 524/700; 524/770
(58) Field of Search ..................................... 528/220, 229, 528/125, 126, 128, 172, 173, 179, 180, 228, 327; 525/471, 480; 524/606, 700, 770

(56) References Cited

U.S. PATENT DOCUMENTS 4,499,260 * 2/1985 Achar et al. .......................... 528/229
5,091,502 * 2/1992 Narang et al. ....................... 528/229

OTHER PUBLICATIONS

Patent Abstracts of Japan, vol. 10, No. 350 (C–387), Nov. 26, 1986, for JP–A–61–149488 (Toshiba), Jul. 8, 1986.

* cited by examiner

*Primary Examiner*—P. Hampton-Hightower
(74) *Attorney, Agent, or Firm*—Sughrue, Mion, Zinn, Macpeak & Seas, PLLC

(57) ABSTRACT

Polymerisable resins which comprise a porphyrinogenic ring system obtained by the reaction of:

(a) one or more compounds selected from the group consisting of pyrrole and N-(lower)alkyl pyrroles, any of which may be optionally substituted, and (b) a $C_4$–$C_6$ saturated alicyclic ketone which is capable of reacting with the 2 or 5 position of the pyrrole ring.

Resin coating systems comprising the said resins.

25 Claims, No Drawings

PORPHYRINOGENIC RESIN SYSTEMS AND POLYMERS DERIVED THEREFROM

FIELD OF THE INVENTION

This invention relates to porphyrinogenic resin systems and methods for their manufacture, and to coating compositions and methods involving such resins. The invention is particularly concerned with anti-corrosion coatings, derived from such resins.

BACKGROUND OF THE INVENTION

In International Patent Application No. PCT/AU91/00298, we described how the condensation of a beta-unsaturated aldehyde, especially crotonaldehyde, and pyrrole can give rise to a monomeric product which contains porphyrin-bearing unsaturated substituents. This monomeric material, which we referred to as a "polymerisable porphyrin", then readily polymerises to produce polymeric product.

Polymers made from the monomeric material, or copolymers formed from the polymerisable material and at least one other polymerisable monomer of a known type, can be used in the production of films, coatings and other structures.

SUMMARY OF THE INVENTION

It is an object of the present invention to provide polymerisable resins and/or compositions derived from them which have improved properties such as, for example, improved anti-corrosion properties.

We have found that this and other objectives can be achieved by reacting a cyclic ketone with pyrrole or an N-alkyl pyrrole, either of which may contain one or more suitable substituents, or a mixture of two or more such pyrroles.

Thus according to one aspect of the present invention, there is provided a polymerisable resin comprising a porphyrinogenic ring system produced by the reaction of:

(a) one or more compounds selected from the group consisting of pyrrole and N-(lower)alkyl pyrroles, any of which may be ring substituted with one or more non-deleterious substituents, with (b) a $C_4$–$C_6$ saturated alicyclic ketone which is capable of reacting with the 2 or 5 position of the pyrrole ring.

DETAILED DESCRIPTION OF THE INVENTION

The reaction generally requires the presence of an acid catalyst, which is selected to suit the particular chosen reagents (a) and (b). The catalyst may be an inorganic acid, or an organic acid, such as acetic or propionic acid, or an acid anhydride, such as phthalic anhydride. Organic acids which contain unsaturated groups may be used. These acids may become incorporated into and provide functional groups in the resin product, as well as providing a catalytic function. Acids containing vinyl groups, such as acrylic acid, or triple bonds, such as acetylene dicarboxylic acid, are especially useful in this regard.

Inorganic acids, especially the hydrohalic acids, such as hydrochloric acid, may also be used either alone or with an organic acid, as described above. Mixtures of an inorganic acid, e.g. HCl, and an unsaturated aliphatic aldehyde, such as acrolein or crotonaldehyde, are also effective catalysts.

Where the reactant (a) is or includes an N-alkylpyrrole, the acid catalyst also has the important function of removal of the alkyl group to allow reaction of the dialkylated pyrrole intermediate with the ketone to give the porphyrinogenic ring system. Hydrochloric acid is especially useful in this regard, particularly when used with cyclohexanone or other cyclic ketones which act as co-solvents for the (normally immiscible) aqueous acid and N-alkylpyrrole.

The preferred cyclic ketone is cyclohexanone.

The extent of the reaction may be controlled by adding one or more suitable reagents which effectively terminate the polymerisation. For example, addition of a $C_1$–$C_8$ aliphatic alcohol, such as butanol, results in "end-capping" of the carboxyl group of an organic acid catalyst. When an inorganic acid catalyst is used, addition of a saturated cyclic monoether, such as tetrahydrofuran (THF), results in ring opening of the cyclic ether by the acid, and the acid is thereby removed from the reaction system. For example, when the catalyst is HCl, reaction with THF results in the formation of 1-chlorobutanol.

The term "porphyrinogenic ring system" as used herein means a porphyrinogen or porphyrinogen-like ring system comprising 5-membered heterocyclic rings linked in a macrocyclic ring structure by linking groups. The linking groups have unsaturated side chains and π-covalent bonding is formed between the macrocyclic ring and the double bonds of the side chains. The porphyrinogenic ring system should also have sufficient electrons to form covalent or coordinate bonds with metals, e.g.>N—M—N<, where M is a metal.

Generally the porphyrinogenic ring system contains four 5-membered heterocyclic rings. When the ketone is cyclohexanone, there will also be four 6-membered carbocyclic rings, comprising the linking groups.

The term "non-deleterious substituent" means a substituent which does not interfere with formation of the porphyrinogenic ring system or the subsequent reaction of the resin product with other materials, as described hereinafter.

In one preferred aspect of the invention the porphyrinogenic resin is obtained by the reaction of pyrrole, N-methylpyrrole, or a mixture of the two, with cyclohexanone in the presence of an acid catalyst.

The resin product may be modified by reaction with one or more acrylic monomers, for example butyl acrylate or acrylic acid. Alternatively, the pyrrole (or other reagent (a)) may be reacted with the modifier before or during reaction with reagent (b), to achieve the desired modification.

The resin products of the invention can be used alone as coating compositions or as part of a coating system. Advantageously, they may be combined with other materials for this purpose, including known coating materials or compositions, or precursors of such materials. Thus coating systems of many kinds can be advantageously formulated using the resin products of this invention. Such coating systems include, for example, combinations of the porphyrinogenic resins with epoxy, phenolic- or alkyd-based resins of known types.

Coatings or coating compositions in accordance with this invention find applications in a variety of fields, for example, they can be used in the paint industry generally and especially in anti-corrosion coatings for metals in the automotive, marine and general engineering industries. They can be utilised as decorative or protective coatings on various substrates, such as metals, paper and ceramics. They can be used as insulating coatings or as coatings for printing or masking substrates, e.g. in processes involving etching.

In particular, the resin products of the invention can be reacted with other unsaturated polymeric or polymerisable materials. Among the reagents which can be used for this purpose are polymerisable monomers, oligomers or other polymer precursors which possess appropriate reactive groups. Oligomer types which contain such groups include:

(i) melamine based oligomers
(ii) epoxy oligomers
(iii) polyurethane oligomers or
(iv) alkyd resin precursors.

Oligomers may be terminated ("end capped") or reactive.

Preferred oligomer types are the alkyd resin precursors, such as acrylic-melamine, melamine-alkyd or simple alkyd formations.

Examples include castor oil base alkyds, soya bean oil alkyds, rosin esters, —OH rich esters and COOH rich esters (rosin precursors), —OH deficient and —COOH deficient resins.

Such reactions may require the presence of a catalyst. Inorganic acids, such as HCl or organic acids, especially acrylic acid, may be used as catalysts. Metal salts are also useful as catalysts, particularly salts of the Transition Metals (Groups 3 to 12 of the Periodic Table) and the heavier metals of Group 14. Apart from acting as catalysts, these metals can also form coordination complexes with porphyrinogenic moieties, giving rise to coloured products which are useful in coating formulations.

Conveniently, the metal halides may be used, examples of which are the chlorides of copper, iron(III), molybdenum, nickel, manganese, mercury and lead. The resin products of the invention have also been found to be capable of undergoing further reaction with metal surfaces and to thereby form strongly adherent coatings which are highly resistant to saline solutions and other corrosive materials.

The resin products of the invention (and their reaction products with other polymeric/polymerisable materials) are also capable of reaction with organic or inorganic pigments, transition metal oxides or transition metal complexes. The coloured coatings thus formed have excellent colour fastness and anticorrosive properties.

The pigment ferric oxide ($Fe_2O_3$), which is present in some commercial coating formulations, can play an important role in the curing (crosslinking) of the coating systems of the invention. Other iron oxides (FeO, $Fe_3O_4$) and the oxides of other transition metals are also useful in this regard.

Two processes involving $Fe_2O_3$ are believed to occur during the curing process:

(i) Reaction between $Fe_2O_3$ and the porphyrinogenic ring system to form a metal-porphyrinogenic complex; and
(ii) A role in the formation of crosslinks between the porphyrinogenic ring system and other polymerisable components in the coating system.

We have found that incorporation of a pigment into the formulation of a porphyrinogenic coating not only enables the coating to be used as a "one pot" (i.e. both top coating and primer) anticorrosion coating, but also significantly improves the anticorrosion properties of the coating.

Some specific, illustrative embodiments of the invention are described below.

A. Pyrrole and cyclohexanone are reacted together in the presence of a catalyst (preferably acetylene dicarboxylic acid). Butyl acrylate is added and the mixture allowed to further react, after which butanol is added to terminate the reaction.

B. Pyrrole and cyclohexanone are reacted together in the presence of a catalyst (preferably HCl and crotonaldehyde). Acrylic acid is added and the mixture allowed to further react. Tetrahydrofuran (THF) is added, to terminate the reaction.

C. Methyl pyrrole, cyclohexanone, and butyl acrylate are reacted in the presence of a catalyst (preferably HCl). Acrylic acid is added and the mixture allowed to further react. Butanol is added to terminate the reaction, followed by addition of THF.

In each of the above embodiments the resin thus obtained may then be converted to a coating formulation by reacting it with at least one other unsaturated resin, for example, in the presence of hydrochloric acid and a suitable aldehyde.

Coating system in accordance with this invention are usually in the form of liquids or semi-solids. They may also be produced in powdered form, for example, by grinding a partially polymerised solid formulation. In use, the temperature of the surface being coated is raised to give fusion of the powdered particles and subsequent rapid crosslinking/curing.

The invention is further described and illustrated by reference to the following non-limiting examples, which show the preparation of various porphyrinogenic resins and their formulation into coatings with other polymerisable resins or commercial coating formulations. The materials used are characterised as follows:

Resin 4835 is produced by UCB, Belgium, and is composed of an acrylated methane resin (90%) and tetraethylene glycol (10%).

Comma Stop Rust is produced by Comma, Gravesend, Kent, U.K. (Product Code GC311EH) and is composed of ferric oxide ($Fe_2O_3$) in a conventional resin formulation.

Coatings were formulated by blending the components shown in the Table comprised in the Examples and were tested for corrosion resistance as follows:

Mild steel nails (100 mm length and 4.8 mm diameter) or mild steel wire pins (63.5 mm length and 1.6 mm diameter) were dip-coated with the formulation under test and air-dried for 5 days. The samples were suspended in salt solutions of varying pH, as set out in Table A and in xylene and butanol. Test were conducted at room temperature and in some cases at 125° C.

TABLE A

Composition of the Corrosion Test Solutions

| | Composition (grams/liter) | | | |
|---|---|---|---|---|
| | NaCl(s)* | 36% HCl | 98% $H_2SO_4$ | NaOH(s) |
| 2.7% Saline, pH = 7 | 27 | | | |
| 2.7% Saline, pH = 2 | 27 | 7 | 2.7 | |
| 2.7% Saline, pH = 4 | 27 | 7 | 2.7 | 4 |
| 2.7% Saline, pH = 13 | 27 | | | 2 |

EXAMPLE 1

Porphyrinogenic resin (Resin A) and coating system (1)

(a) Resin

TABLE 1

Preparation of Porphyrin Resin A

| Material | Composition (%) |
|---|---|
| Pyrrole | 10 |
| Cyclohexanone | 36 |
| ADCA | 0.24 |

TABLE 1-continued

Preparation of Porphyrin Resin A

| Material | Composition (%) |
|---|---|
| Butyl acrylate | 36 |
| Butanol | 27.76 |

The procedure for producing Resin A is as follows.

Reactions were carried out at room temperature, i.e. 20–25° C., unless otherwise specified.

ADCA (acetylenedicarboxylic acid; the catalyst) was dissolved in cyclohexanone. Pyrrole was to the ADCA-cyclohexanone solution and the reaction allowed to proceed for 3 hours at room temperature (or 2 hours at 60°–65° C.). In practice, the end point of this reaction is indicated by the colour change of the reaction system from amber to orange.

Butyl acrylate was then added and the reaction system heated at 85°–90° C. for 2–3 hours. The end point of this reaction is determined by the increase of the viscosity of the reaction system to a desired value.

At this point, butanol is added which terminates the reaction by esterification of (blocking) the residual —COOH groups. The temperature of the reaction system then is brought up to between 110° and 115° C. and maintained in that range for a further hour to obtain the product (Resin A).

(b) Formulation.

The formulation is given in Table 2. Resin A is blended with the catalyst (HCl and crotonaldehyde), Resin 4835 and xylene to give the coating system.

TABLE 2

Formulation of Porphyrinogenic Coating System 1.

| Substance | Composition (%) |
|---|---|
| Resin A | 61.6 |
| Catalyst {5% HCl (36%), 95% Crotonaldehyde} | 10 |
| Resin 4853 | 23.4 |
| Xylene | 5 |

(c) Testing

Test results are set out in Table 3.

TABLE 3

Anticorrosive Properties of Porphyrin Coating System 1.

| Corrosive Environment | Observation |
|---|---|
| | At Room Temperature |
| (1) 2.7% Saline, pH 2 | Neither rust on the metal surface nor damage of the coating is observed after 146 days. Coating remains tough. |
| (2) 2.7% Saline, pH 4 | Same as in (1). |
| (3) 2.7% Saline, pH 7 | One rusty pin-hole was observed after 94 days which developed into a rusty area about 1 mm in diameter after 145 days. Coating remains tough. |
| (4) 2.7% Saline, pH 13 | One pin-hole was observed after 101 days which developed into a rusty area about 1 mm in diameter after 146 days. Also coating became soft. |

TABLE 3-continued

Anticorrosive Properties of Porphyrin Coating System 1.

| Corrosive Environment | Observation |
|---|---|
| (5) Xylene | No damage on coating was observed after 146 days. Coating remained tough. |
| (6) Butanol | No damage on coating is observed after 146 days but two pin holes were observed. |
| | At 125 ° C. |
| (7) 2.7% Saline, pH 7 | No damage on the coating was observed in the immersed part after 24 days. (*) |

(*) Sample was discarded due to rust in the unimmersed part. This is probably due to the crystallised NaCl on the unimmersed coating surface while water evaporates from the corrosive solution at the elevated temperature.

EXAMPLE 2

Porphyrinogenic Coating System (2) based on Resin A (a) Resin A (Example 1(a)) was used.

(b) Formulation

TABLE 4

Formulation of Porphyrin Coating System 2

| Material | Composition (%) |
|---|---|
| Resin A | 42 |
| Resin 4835 | 54 |
| Comma (Commercial grade) | 42 |
| Xylene | 2 |

(c) Testing

Test results are set out in Table 5.

TABLE 5

Anticorrosive Properties of Porphyrinogenic Coating System 1.

| Corrosive Environment | Observation |
|---|---|
| | At Room Temperature |
| (1) 2.7% Saline, pH 2 | Coating remains perfect after 60 days. |
| (2) 2.7% Saline, pH 4 | Same as in (1). |
| (3) 2.7% Saline, pH 7 | Same as in (1). |
| (4) 2.7% Saline, pH 13 | Same as in (1). |
| (5) Xylene | Several pin-holes observed after 60 days. |
| (6) Butanol | Coating remains perfect after 60 days. |
| | At 125° C. |
| (7) 2.7% Saline, pH 7 | Coating remained perfect after 60 days. (*) |

(*) Sample was discarded due to rust in the unimmersed part. This is probably due to the crystallised NaCl on the unimmersed coating surface while water evaporates from the corrosive solution at the elevated temperature.

EXAMPLE 3

Porphyrinogenic resin (Resin B) and coating system (3)

(a) Resin

TABLE 6

Preparation of Porphyrinogenic resin (Resin B) Coating System 3.

| Substance | Composition (%) |
|---|---|
| Pyrrole | 7.4 |
| Cyclohexanone | 40.7 |
| Acrylic Acid | 17.2 |
| Catalyst | 1.3 |
| {7.7% HCl (36%); 92.3% Crotonaldehyde} | |
| THF | 5.0 |
| Xylene | 28.4 |

Resin B was prepared as follows.

Cyclohexanone and the catalyst (crotonaldehyde and HCl) were thoroughly mixed. Pyrrole was added while stirring and the reaction allowed to proceed for 15 to 30 minutes. Acrylic acid was then added and the reaction allowed to proceed for 24 hours, after which THF was added and the reaction allowed to proceed for one hour. Finally xylene was added.

(c) Testing

Test results are set out in Table 7.

TABLE 7

Anticorrosive Properties of Porphyrinogenic Coating System 3.

| Corrosive Environment | Observation |
|---|---|
| At Room Temperature | |
| (1) 2.7% Saline, pH 2 | Neither rust on the metal surface nor damage of the coating was observed after 92 days. Coating remained tough. |
| (2) 2.7% Saline, pH 4 | Same as in (1). |
| (3) 2.7% Saline, pH 7 | Same as in (1). |
| (4) 2.7% Saline, pH 13 | Same as in (1). |
| (5) Xylene | Two pin-holes were observed after 92 days. Coating remained tough. |
| (6) Butanol | No damage to the coating was observed after 92 days. Coating remains tough. |
| (7) Cyclohexanone | Coating cracked after five hours. All coating fell off the metal surface after 24 hours. |
| At 125 ° C. | |
| (8) 2.7% Saline, pH 7 | Coating remained perfect after 61 days. (*) |

(*) Sample was discarded due to rust in the unimmersed part. This is probably due to the crystallised NaCl on the unimmersed coating surface while water evaporates from the corrosive solution at the elevated temperature.

EXAMPLE 4

Porphyrinogenic resin (Resin C) and coating systems (4 and 5)

(a) Resin

TABLE 8

Preparation of Porphyrinogenic Resin C

| Material | Composition (%) |
|---|---|
| Methylpyrrole | 4.5 |
| Cyclohexanone | 46.2 |
| Butyl acrylate | 4.5 |
| HCl (36%) | 0.4 |
| Acrylic acid | 6.6 |
| Butanol | 33.3 |
| THF | 4.5 |

Resin C was prepared as follows.

Cyclohexanone, butyl acrylate and the catalyst (HCl) were thoroughly mixed. Methylpyrrole was added while stirring and the reaction allowed to proceed for 15 to 30 minutes, during which methyl groups were effectively removed from the methylpyrrole. Acrylic acid was then added and the reaction allowed to proceed for 10 hours at room temperature (or at 50–60° C. for 2 hours). The temperature was then increased to 80° C. and the reaction proceed allowed to proceed for two hours at this temperature.

Butanol was then added, the temperature increased to 115° C. and the reaction allowed to proceed for a further hour. The reaction mixture was cooled to between 100° C. and 110° C. THF was added and the reaction allowed to proceed for one further hour.

(b) Formulation

Two typical coating systems made by blending Resin C with other resins and solvents, are described as follows.

(i) Coating System (4). Resin C was blended with an equal amount of Comma Stop Rust. The results of the anti-corrosion studies of this coating system are detailed in Table 9.

TABLE 9

Anticorrosive Properties of Porphyrinogenic Coating System 4.

| Corrosive Condition | Observation |
|---|---|
| At Room Temperature | |
| (1) 2.7% Saline, pH 2 | Neither rust on the metal surface nor damage of the coating was observed after 110 days. Coating remained tough. |
| (2) 2.7% Saline, pH 4 | Same as in (1). |
| (3) 2.7% Saline, pH 7 | Same as in (1) but one pin-hole was observed. |
| (4) 2.7% Saline, pH 13 | Same as in (1). |
| (5) Xylene | No damage on coating was observed after 110 days. Coating remained tough. |
| (6) Butanol | No damage to the coating was observed after 110 days but a small number of pin-holes were observed. |

TABLE 9-continued

Anticorrosive Properties of Porphyrinogenic Coating System 4.

| Corrosive Condition | Observation |
|---|---|
| | At 125° C. |
| (7) 2.7% Saline, pH 7 | No rust of the metal surface was observed after 37 days but a small number of pin-holes on the coating were observed. Experiment was terminated after 40 days because unimmersed part cracked. |

(ii) Coating System (5)

Coating system (5) was obtained by blending 39% of Resin C with 49.7% of the commercial Comma Stop Rust and 11.3% of Resin 4853. Its anti-corrosion properties are shown in Table 10.

TABLE 10

Anticorrosive Properties of Porphyrinogenic Coating System 5.

| Corrosive Condition | Observation |
|---|---|
| | At Room Temperature |
| (1) 2.7% Saline, pH 2 | Neither rust on the metal surface nor damage of the coating was observed after 112 days. Coating remained tough. |
| (2) 2.7% Saline, pH 4 | Same as in (1). |
| (3) 2.7% Saline, pH 7 | Same as in (1) but one pin-hole was observed. |
| (4) 2.7% Saline, pH 13 | Same as in (1). |
| (5) Xylene | No damage on coating was observed after 112 days. Coating remained tough. |
| (6) Butanol | No damage to the coating was observed after 112 days but a small number of pin-holes were observed. |
| | At 125° C. |
| (7) 2.7% Saline, pH 7 | No damage to the coating surface was observed other than one rusting pin-hole after 42 days. Experiment was terminated after 45 days because unimmersed part cracked. |

EXAMPLE 5

Porphyrinogenic resin (Resin D) and coating system (6)

This example illustrates resin formation wherein acrylic acid functions as both a catalyst (for the formation of the porphyrinogenic resin) and a reactant for modifying the resin product.

(a) Resin

TABLE 9

Preparation of Porphyrinogenic Resin D

| Material | Composition (%) |
|---|---|
| Cyclohexanone | 36.72 |
| Acrylic acid | 20.00 |
| Crotonaldehyde | 1.00 |
| HCl (36%) | 0.03 |
| Pyrrole | 7.91 |

TABLE 9-continued

Preparation of Porphyrinogenic Resin D

| Material | Composition (%) |
|---|---|
| Butanol | 19.40 |
| THF | 2.99 |
| Butyl acetate | 11.95 |

Resin D was prepared as follows.

The cyclohexanone, acrylic acid, crotonaldehye and HCl were thoroughly mixed. Pyrrole was added while stirring and the reaction allowed to proceed for 4 to 5 hours at room temperature. The temperature was then increased to 65±2° C. and the reaction proceed allowed to proceed for a further 1–2 hours at this temperature.

Butanol was then added (to block the COOH groups of the acrylic acid), the temperature was increased to 75±2° C. and the reaction was allowed to proceed for a further 1–2 hours. THF was added dropwise (to remove residual HCl) and the reaction allowed to proceed for one further hour at 65–70° C.

The reaction system was allowed to cool to below 50° C., the butyl acetate (which serves as a solvent) was added with stirring and the mixture thoroughly stirred.

(b) Formulation

Coating System (6). Resin D (43.64%) was blended with Resin 4835 (14.55%), Comma Stop Rust (27.27%) and butyl acetate (14.54%). The results of the anti-corrosion studies of this coating system are detailed in Table 10.

TABLE 10

Anticorrosive Properties of Porphyrinogenic Coating System 6.

| Corrosive Condition | Observation |
|---|---|
| | At Room Temperature |
| (1) 2.7% Saline, pH 2 | Neither rust on the metal surface nor damage of the coating was observed after 114 days. Coating remained tough. |
| (2) 2.7% Saline, pH 4 | Same as in (1). |
| (3) 2.7% Saline, pH 7 | Same as in (1). |
| (4) 2.7% Saline, pH 13 | Same as in (1). |
| (5) Xylene | Two pin-holes were observed after 114 days. Coating remained tough. |
| (6) Butanol | No damage to the coating was observed after 114 days; Coating remained tough. |
| (7) Cyclohexanone | Coating cracked after 5 hours. All coating fell off the metal surface after 24 hours. |
| | At 125° C. |
| (S) 2.7% Saline, pH 7 | Coating remained perfect after 64 days. (Sample was discarded because coating cracked due baking.) |

EXAMPLE 6

Coating System (7)

This example demonstrates an anticorrosion coating formulation using iron oxide, silicon dioxide and zinc oxide as the pigment system. This is an alternative to the system described in Example 5, which uses the commercial product "Comma Stop Rust".

(a) Formulation

The formulation of an anticorrosion coating system, based on porphyrinogenic resin (Y) and an iron oxide/silicon dioxide/zinc oxide pigmentation system (X), is given in Table 11.

TABLE 11

Formulation of Pigmented Porphyrinogenic Coating System

| Materials | Composition (%) |
|---|---|
| Iron Oxide | 12.14 |
| Silicon Dioxide | 1.70 |
| Zinc Oxide | 1.94 |
| Resin 4835 | 16.72 |
| Resin AT-410* | 10.50 |
| Butanol | 14.50 |
| Tetramethylsilane | 0.50 |
| Porphyrinogenic Resin (D)** | 42.00 |

*an acrylic resin made by Rohm and Haas Company, Philadelphia, PA, USA
**from Example 5

Zinc oxide is a non-toxic, white pigment which has good anticorrosion properties, good light fastness, good resistance to temperature extremes and good weatherability. Because of its slight basicity zinc oxide can react with the residual carboxyl acids in resins to form carboxylic group/zinc complexes. This reaction increases the viscosity of the coating system and consequently inhibits the flocculation of pigments during storage of coloured coatings.

Silicon dioxide is well known in the art and used as a viscosity modifying, and strength enhancing filler in coating formulations. Silicon dioxide also gives a significant shear-thickening tendency to the total resin system. While this property helps prevent the silicon dioxide from flocculating during storage of the compositions, it may give rise to difficulties in the milling operation.

Tetramethylsilane (TMS) is included to prevent pigment floating. As such, it is widely used in the coatings industry. During curing processes, pigments tend to migrate to the surface of the coating thus giving rise to colour separation on the coating surface, when cured. Iron oxide, being low in its specific weight, has a tendency to migrate towards the coating surface. Tetramethylsilane and related compounds, when included in a coating formulation, can form a uniform thin film on the coating surface which reduces the rate of solvent evaporation from the coating system and also reduces the surface tension of pigment. Thus, the uniformity of components in the coating system can be maintained at the desired level during the process of cure and consequently, colour separation phenomena can be minimised.

Each of the above components (zinc oxide, silicon dioxide and TMS) can be replaced by other materials having similar functions and known per se in the art.

(b) Preparation

As can be seen from Table 11, the anticorrosion coating system is composed of 58% of mixture X and 42% of porphyrinogenic resin (Y). The system was prepared as follows:

15 g of Resin 4835 (UCB) was mixed with 50 g of butanol in a ball-milling container with stirring to achieve a uniform mixture. 50 g of iron oxide, 7 g of silicon dioxide and 8 g zinc oxide were added to the mixture. Again, stirring was needed to help the dispersion of these pigments/fillers in the mixture.

Ball-milling spheres are put into the ball-milling container and the mixture was milled until the particle size of the pigments/fillers fell below 20 µm. 55 g of Resin 4835, 45 g of Resin 410A and tetramethylsilane were then mixed in to give the iron-oxide based anticorrosion resin (X). Mixing was terminated when a uniform distribution of all the components had been achieved.

Resin X was then mixed with the porphyrinogenic resin (Y) in the ratio 58:42 to give the final anticorrosion coating.

(c) Coating Properties (i) Non-volatile Solids

Non-volatile solids content provides one of the quality control parameters in coating manufacture. It is defined as the ratio of the weight ($W_2$) of the non-volatile solids to the weight of total coating sample ($W_1$). The weight of non-volatile solids is that of the coating sample measured after the coating has been heated at 120° C. is an oven for 3 hours. The non-volatile solids value is expressed percentage terms, i.e. $W_2 \times 100/W_1$ (%).

(ii) Particle Size (or Pigment Dispersion)

The particle size of pigments in coating is one of the important parameters in quality control. From a physical point of view, the size of the pigment particles in the individual coating system has great effects on the uniformity of pigment distribution in the coating, on the gloss of coating surface, on the anticorrosion properties and on the stability during storage. For approximate assessments of particle size in "real coatings", a grind gauge is usually used. The readings have units of µm.

(ii) Levelling time

The levelling time of coating is a measure of the time taken to achieve levelness in the coating after it has been applied to a smooth surface either by brushing or by spraying. The usual approach to measuring the coating leveling time is as follows:

(1) Apply the first coating layer onto object surface with a paint brush.

(2) Apply, with a paint brush, the second coating layer, on top of the first coating layer, when the first coating layer is surface-dry. With paint brush, immediately stroke across the second layer in the direction perpendicular to the normal brushing direction.

(3) The time for the bush marks to disappear, i.e. for the paint surface to level up to a smooth surface, is recorded.

The leveling time of coating is usually defined as grades. A satisfactory leveling time concerns a paint with a leveling time of less than 10 minutes. An acceptable leveling time concerns to paint with leveling time between 10 and 15 minutes. Unacceptable leveling times concerns to paint with leveling time longer than 15 minutes.

(iv) Dry Hiding Power

The approach to measurements of the dry hiding power of X-Y prophyrinogenic coating employed in our laboratory is as follows:

(1) Introduce a specific, known amount of the X-Y porphyrinogenic coating system into a 10 cm$^3$ glass sample bottle.

(2) Coat, uniformly, a glass plate with black and white square area, using X-Y porphyrinogenic coating from the sample bottle. The coating is applied as thinly as possible while ensuring that no white areas are visible.

(3) Weigh the bottle with remaining X-Y porphyrinogenic coating to obtain the amount of coating sample used.

The dry hiding power, $P_{DH}$ is calculated by $$P_{DH} = \frac{G(\text{gram})}{A(\text{m}^2)}$$

where, $P_{DH}$ denotes dry hiding power of the coating sample, G refers to weight of coating sample used and A is the total area of glass plate.

(v) Curing Time

Curing of the coating can be classified into three stages. These are surface cure, through cure and full cure. In most coating application processes, it is desirable that the surface cure and the through cure should take short time while full cure takes relatively long time. This is because rapid surface cure and through cure ensure the existing of a rapid coating application process and the slower full cure gives a highly ordered crosslinking and complexing which consequently ensures the development of good coating properties.

The times for surface cure and through cure of X-Y porphyrinogenic coating were measured. The measuring methods are as follows. (The full cure time was not measured.)

Surface-cure Time

A dry cotton ball of about 5 mm diameter is placed on the surface of the coating panel. The coating panel is placed about 10–15 cm from an air jet. Slight blowing is then applied on the cotton ball. Surface cure is considered to be achieved when the cotton ball can be blown off the coating surface and no cotton fibre sticks to the coating surface. The surface cure time is the time which elapses between the end of the coating application and the time when surface cure is confirmed.

Through Curing Time

A 20×20 mm$^2$ quantity filter paper is placed on the surface of coated panel. A 200 g weight with circular bottom (1.13 cm in diameter) is then placed on top of the filter paper. After 30 seconds, the weight is removed and the coating panel turned upside down. Through cure is considered to have been realised if the filter paper falls off the coated surface and no fibre sticks to the coated surface. The time which elapses between the end of coating application and the time when through cure is achieved is the through cure time.

(d) Results

The basic coating properties of the X-Y porphyrinogenic coating derived from our measurements, are given as Table 12.

For comparison, the properties of the porphyrinogenic coating based on the previous formulation (Example 5) involving Comma Stop Rust as are given as Table 13.

TABLE 12

Properties of the X-Y Porphyrinogenic Coating System

| Property | Value |
|---|---|
| Non-volatile Solids | 53.19% |
| Dispersion | <20 μm |
| Surface Curing Time | Room Temperature 15 mins |
| | 120° C. 5 mins |
| Through Curing Time | Room Temperature 3.0 hours |
| | 120° C. 0.5 hours |
| Leveling Time | 10–15 mins |
| Dry Hiding Power | 58 g/m$^2$ |

TABLE 13

Properties of Example 5 Formulation (involving Comma Stop Rust)

| Property | Value |
|---|---|
| Non-volatile Solids | 53.05 |
| Dispersion | <20 μm |
| Surface Curing Time | Room Temperature 20 mins |
| | 120° C. 10 mins |
| Through Curing Time | Room Temperature 4.5 hours |
| | 120° C. 1.0 hours |
| Leveling Time | 10 mins |
| Dry Hiding Power | 60 g/m$^2$ |

The anticorrosion properties of the X-Y system are shown in Table 14.

TABLE 14

Anticorrosive Properties of Porphyrinogenic Coating System (7)

| Corrosive Condition | Observation |
|---|---|
| At Room Temperature | |
| (1) 2.7% Saline, pH 2 | Coating remains hard after 150 days |
| (2) 2.7% Saline, pH 4 | Rusty areas observed after 124 days |
| (3) 2.7% Saline, pH 7 | Rusty areas observed after 120 days |
| (4) 2.7% Saline, pH 13 | Rusty areas observed after 24 days |
| (5) Xylene | Coating fell off after 70 days |
| (6) Butanol | Coating fell off after 65 days |
| At 125° C. | |
| (7) 2.7% Saline, pH 7 | Rusty areas observed after 20 days |

EXAMPLE 7

Coating System (8)

This example demonstrates another anticorrosion coating formulation using iron oxide. This is an alternative to the system described in Example 6, in which the UCB Resin 4835 and Rohm & Hass Resin AT-410 are replaced by other commercial resins which show improved compatibility with the porphyrinogenic resin.

(a) Formulation

The system was formulated from the materials listed in Table 15.

TABLE 15

Formulation of Pigmented Porphyrinogenic Coating System

| Materials | Composition (%) |
|---|---|
| Iron Oxide | 10.50 |
| NaBO$_4$ | 2.31 |
| Heucophos ZPZ[1] | 2.10 |
| Pole Star 200P Al—Si[2] | 1.68 |
| Butanol | 4.00 |
| UCB Ebecryl 600[3] | 12.15 |
| Synolac 9110[4] | 23.00 |
| Dow Corning Silicate Additive 29[5] | 1.26 |

TABLE 15-continued

Formulation of Pigmented Porphyrinogenic Coating System

| Materials | Composition (%) |
|---|---|
| BYK Additive 307[6] | 1.00 |
| Porphyrinogenic Resin (D)** | 42.00 |

[1]Heucophos ZPZ is a modified phosphate hydrate-based wetting agent manufactured by Heuback GmBH and Co., Germany.
[2]Pole Star 200P Al—Si is a mixture containing $Al_2O_3$ and $SiO_2$ supplied by Kalon Group plc, UK.
[3]UCB Ebecryl 600 is an epoxy acrylate resin manufactured by UCB, Belgium.
[4]Synolac 9110 is an alkyd resin manufactured by Toval (Cray Valley Products Ltd, UK).
[5]Dow Corning Silicate Additive 29 contains the C—OH functional group. It is an additive designed to assist in leveling and flow-out. It also has anti-floating properties.
[6]BYK Additive 307 is a polyether-modified dimethyl polysioxane copolymeric assembly designed to increase surface slip, substrate wetting and leveling.
**from Example 5

The iron oxide, NaBO4, (anticorrosion agent) Heucophos ZPZ, Pole Star 200P Al—Si, butanol and half of the specified amount of UCB Ebecryl 600 were placed in a ball milling jar. The mixture was ball milled until the particle size was less than 20 µm.

The milled ingredients were then blended with the balance of the Ebecryl 600 and the Synolac 9110, Dow Corning Silicate Additive 29 and BYK Additive 307 (the last two being added as a 1% solution in butanol) to give a pigmented resin.

58% by weight of this mixture was blended with 42% of porphyrinogenic resin (D), to produce a ready-to-apply resin coating system.

(b) Coating Curing Properties

The ready-to-apply coating system, prepared as above, has the curing rates detailed in Table 16.

TABLE 16

Pigmented Coating Curing Properties

| Curing Temperature | Curing Status | Curing time |
|---|---|---|
| Room Temperature (20° C.) | Surface Cure | 30 minutes |
| | Through Cure | 300 minutes (5 hours) |
| 120° C. | Surface Cure | 10 minutes |
| | Through Cure | 60 minutes (1 hour) |
| 260° C. | Surface Cure | 15 seconds |

(c) Anticorrosion Properties of Coatings

The pigmented porphyrinogenic coating prepared according to the formulation as given in Table 15 has superior gloss. This gloss is maintained for more than 48 hours at 120° C. The ready-to-apply coating system, (i.e. the mixture of the pigmented resin and the porphyrinogenic resin) is stable for at least seven days at room temperature. The results of anticorrosion studies are described in Table 17.

TABLE 17

| Corrosion Environment | Corrosion Temperature | Observation | Remarks |
|---|---|---|---|
| 5% Saline, pH 2 | Room Temperature (20° C.) | Coating remains hard and glossy after 65 days | Saline Resistance |
| 5% Saline, pH 4 | | | |
| 5% Saline, pH 7 | | | |
| 5% Saline, pH 13 | | | |

TABLE 17-continued

| Corrosion Environment | Corrosion Temperature | Observation | Remarks |
|---|---|---|---|
| 5% Saline, pH 7 | 120° C. | One rusty pin-hole after 61 days. Several rusty areas appear after 65 days | |
| Fridge Roof | −20° C. | Coating remains hard and glossy after 65 days | Weathering Effect |
| Xylene | Room Temperature | Coating becomes soft | Solvent Resistance |
| Butanol | | Coating becomes soft and solvent becomes light-red | |

EXAMPLE 8

Coating System (9)

This example shows the preparation of a powdered porphyrinogenic resin coating system.

TABLE 18

Preparation of a Powdered Porphyrinogenic Resin

| Material | Composition (%) |
|---|---|
| Pyrrole | 7.6 |
| Cyclohexanone | 22.0 |
| Crotonaldehyde | 1.7 |
| Acrylic acid | 11.7 |
| $Fe_2O_3$ | 14.8 |
| $NaBO_4$ | 3.2 |
| GY260[1] | 33.7 |
| Heucophas ZPZ | 2.9 |
| Pole Star 200P Al—Si | 2.4 |

[1]GY260 is an epoxy resin manufactured by Ciba-Geigy AG

The resin was prepared as follows:

The pyrrole, cyclohexanone, crotonaldehyde and acrylic acid were mixed and gently and continuously stirred for 15 hours at room temperature. The GY260 resin was added and the mixture stirred for a further hour at 120° C.

The remaining materials were added and the mixture stirred for a further 10 minutes at 120–130° C.

Because of the presence of the epoxy resin component (GY260) the resulting solid product is only partially cured or is capable of delayed cure. The solid product is ground to produce the powdered resin product.

What is claimed is:

1. A polymerisable resin characterised in that it comprises a porphyrinogenic ring system obtained by the reaction of:
   (a) one or more compounds selected from the group consisting of pyrrole and N-(lower)alkyl pyrroles, any of which is unsubstituted or ring substituted with one or more substituents which do not interfere with formation of the porphyrinogenic ring system or with a subsequent reaction of the resin, and
   (b) a $C_4$–$C_6$ saturated alicyclic ketone which reacts with the 2 or 5 position of the pyrrole ring.

2. A polymerisable resin characterised in that is comprises a porphyrinogenic ring system obtained by the reaction of:
   (a) pyrrole, N-methylpyrrole, or a mixture of the two, any of which is unsubstituted or ring substituted with one or more substituents which do not interfere with formation of the porphyrinogenic ring system or with a subsequent reaction of the resin, and
   (b) a $C_4$–$C_6$ saturated alicyclic ketone which reacts with the 2 or 5 position of the pyrrole ring.

3. A resin as claimed in claim 1 or claim 2, characterised in that the ketone (b) is cyclohexanone.

4. A resin as claimed in claim 1 or claim 2, characterised in that it is modified with at least one acrylic monomer.

5. A process for preparing a polymerisable resin which comprises a porphyrinogenic ring system, wherein said process comprises reacting (a) one or more compounds selected from the group consisting of pyrrole and N-(lower) alkyl pyrroles, any of which is unsubstituted or ring substituted with one or more substituents which do not interfere with formation of the porphyrinogenic ring system or with a subsequent reaction of the resin, and (b) a $C_4$–$C_6$ saturated alicyclic ketone which reacts with the 2 or 5 position of the pyrrole ring, in the presence of an acid catalyst.

6. A process as claimed in claim 5, characterised in that the acid catalyst comprises an inorganic acid, an organic acid, or an acid anhydride, or a mixture of any two or more of such acids or anhydrides.

7. A process as claimed in claim 6, characterised in that the acid catalyst comprises acetic acid, propionic acid or phthalic anhydride.

8. A process as claimed in claim 6, characterised in that the acid catalyst comprises an organic acid which contains at least one unsaturated group.

9. A process as claimed in claim 8, characterised in that the acid catalyst contains a vinyl group or a triple bonded group.

10. A process as claimed in claim 5, characterised in that the acid catalyst comprises a mixture of an inorganic acid and an unsaturated aliphatic aldehyde.

11. A process as claimed in claim 6, characterised in that the reactant (a) is or includes an N-alkylpyrrole and the acid catalyst also functions to remove the N-alkyl group to allow reaction of the pyrrole intermediate with the ketone (b) to give the porphyrinogenic ring system.

12. A process as claimed in claim 10, characterised in that the acid catalyst is or comprises hydrochloric acid.

13. A process as claimed in claim 5, characterised in that the ketone (b) is cyclohexanone.

14. A process as claimed in claim 5, characterised in that the pyrrole reagent (a) is reacted with an acrylic monomer before or during reaction with reagent (b).

15. A resin coating system, characterised in that it comprises a polymerisable resin as claimed in claim 1.

16. A resin coating system as claimed in claim 15, characterised in that it includes at least one other known coating material selected from the group consisting of epoxy-, phenolic-, and alkyd-based resins.

17. A resin coating system as claimed in claim 15, characterised in that the polymerisable resin is reacted with at least one unsaturated polymeric or polymerisable material.

18. A resin coating system as claimed in claim 17, characterised in that the polymerised or polymerisable material is one or more of the following:

(i) a melamine based oligomer (ii) an epoxy oligomer (iii) a polyurethane oligomer or (iv) an alkyd resin precursor.

19. A resin coating system as claimed in claim 17, characterised in that the reaction is carried out in the presence of a catalyst selected from inorganic acids, organic acids and metal salts.

20. A resin coating system as claimed in claim 19, wherein the catalyst is a salt of a metal selected from Groups 3 to 12 of the Periodic Table.

21. A resin coating system as claimed in claim 20, characterised in that the metal salt is a chloride of copper, iron (III), molybdenum, nickel, manganese, mercury or lead.

22. A resin coating system as claimed in claim 17, characterised in that the resin is further reacted with an organic pigment, an inorganic pigment, a transition metal oxide or a transition metal complex.

23. A resin coating system as claimed in claim 22, characterised in that the inorganic pigment is ferric oxide.

24. A coated substrate, wherein the substrate is an entity which provides a surface to be coated, characterised in that the coating consists of or is formed from a resin coating system as claimed in claim 15.

25. A coated substrate as claimed in claim 24, wherein the substrate is metal, paper or ceramic.

* * * * *